United States Patent
Reddy et al.

(10) Patent No.: US 9,450,913 B2
(45) Date of Patent: Sep. 20, 2016

(54) CDNI REQUEST ROUTING USING FLOW METADATA

(71) Applicant: Cisco Technology, Inc., San Jose, CA (US)

(72) Inventors: Tirumaleswar Reddy, Karnataka (IN); Bill Ver Steeg, Buford, GA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 14/169,526

(22) Filed: Jan. 31, 2014

(65) Prior Publication Data
US 2015/0222595 A1    Aug. 6, 2015

(51) Int. Cl.
*G06F 15/173*    (2006.01)
*H04L 29/12*    (2006.01)

(52) U.S. Cl.
CPC ....... *H04L 61/2528* (2013.01); *H04L 61/2514* (2013.01); *H04L 61/2517* (2013.01); *H04L 61/2582* (2013.01)

(58) Field of Classification Search
None
See application file for complete search history.

(56) References Cited

U.S. PATENT DOCUMENTS

| 2014/0089386 A1* | 3/2014 | Bondrescu | H04L 61/2582 709/203 |
| 2015/0113588 A1* | 4/2015 | Wing | H04L 63/0227 726/1 |

* cited by examiner

*Primary Examiner* — Brian P Whipple
(74) *Attorney, Agent, or Firm* — Parker Ibrahim & Berg LLC; James M. Behmke; Stephen D. LeBarron

(57) ABSTRACT

Methods, systems, and apparatus, including computer programs encoded on a computer storage medium for Content Delivery Networks Interconnection (CDNI) request routing using the PCP FLOWDATA option. In one aspect, a method includes receiving a request for content, and receiving, from a PCP server, flow characteristics for providing the content, where the PCP server receives the flow characteristics for providing the content from a PCP proxy that receives the flow characteristics from the client device. The method includes transmitting first data for querying the downstream content delivery network (CDN) to determine whether the downstream CDN can provide the content and satisfy the flow characteristics. The method includes receiving a response indicating the ability of the downstream CDN to provide the content and satisfy the flow characteristics, and transmitting second data based on the response, where the client device transmits flow metadata based on the second data to the PCP proxy.

20 Claims, 5 Drawing Sheets

CDNI REQUEST ROUTING USING FLOW METADATA

TECHNICAL FIELD

This disclosure relates to delivering content and in particular to delivering content at requested bitrates and times.

BACKGROUND

A client device may request content from a content delivery network. The content delivery network may have several different locations that can provide the requested content to the client device. Content delivery network may try to select the server which can serve the requested content and whose location is closer to the client for better user experience.

DESCRIPTION OF EXAMPLE EMBODIMENTS

Overview

Figure 1:
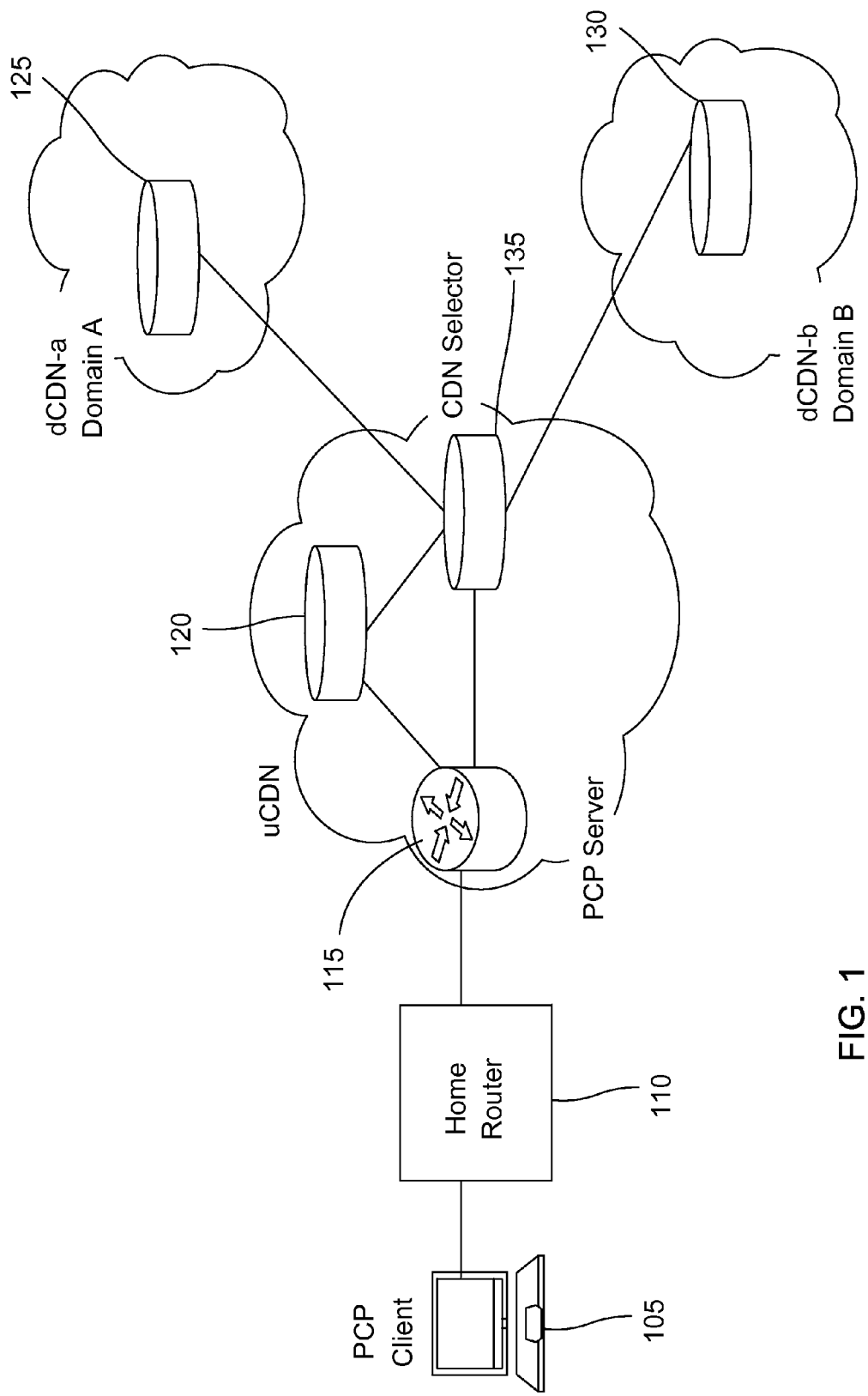
FIG. 1 illustrates an example content delivery system that uses Port Control Protocol (PCP).

Some implementations may provide a computer-program product that is embedded in a non-transitory machine-readable medium and stores instructions that are executable by a processor and configured to cause the processor to perform operations for a content delivery network request using flow metadata. The operations include receiving, by an upstream content delivery network and from a client device, a request for content; receiving, from a PCP server, flow characteristics for providing the content, where the PCP server receives the flow characteristics for providing the content from a PCP proxy that receives the flow characteristics from the client device; transmitting, to a downstream content delivery network, first data for querying the downstream content delivery network to determine whether the downstream content delivery network can provide the content and satisfy the flow characteristics; receiving, from the downstream content delivery network, a response indicating the ability of the downstream content delivery network to provide the content and satisfy the flow characteristics; and transmitting, to the client device, second data based on the response indicating the ability of the downstream content delivery network to provide the content and satisfy the flow characteristics, where the client device transmits flow metadata based on the second data to the PCP proxy, and where the PCP proxy transmits the flow metadata to the PCP server to indicate a priority level to give to the content received from the downstream content delivery network.

DETAILED DESCRIPTION

A content delivery network may receive a request for content from a client device using Port Control Protocol (PCP). The request for content may be a PCP request containing a FLOWDATA option that specifies the parameters that the client device would like to receive the content, such as bitrate. The upstream content delivery network receives the request and queries various downstream content delivery networks to determine the one that can serve the content at the requested parameters. The content delivery network notifies the client device of the downstream content delivery network that can deliver the content at the requested parameters. The client device then requests the content from the downstream content delivery network and instructs the network using PCP to give the content data a particular priority with respect to other data traffic.

A PCP client is a PCP software instance responsible for issuing PCP requests to a PCP server. Several independent PCP Clients can exist on the same host. Several PCP Clients can be located in the same local network. A PCP Client can issue PCP requests on behalf of a third party device for which it is authorized to do so. An interworking function from Universal Plug and Play Internet Gateway Device to PCP is another example of a PCP Client. A PCP server in a NAT gateway that is itself a client of another NAT gateway (nested NAT) may itself act as a PCP client to the upstream NAT.

A PCP server is a PCP software instance that resides on the NAT or firewall that receives PCP requests from the PCP client and creates appropriate state in response to that request.

The FLOWDATA option described in this document allows a host to signal the bi-directional characteristics of a flow to its PCP server. After signaling, the PCP server determines if it can accommodate that flow, making configuration changes if necessary to accommodate the flow, and returns information in the FLOWDATA option indicating its ability to accommodate the described flow.

There are four uses for the PCP PEER Opcodes described in this specification: a host operating a server and wanting an incoming connection; a host operating a client and server on the same port; a host operating a client and wanting to optimize the application keep alive traffic; and a host operating a client and wanting to restore lost state in its NAT.

When operating a server the PCP client knows if it wants an IPv4 listener, IPv6 listener, or both on the Internet. The PCP client also knows if it has an IPv4 address or IPv6 address configured on one of its interfaces. It takes the union of this knowledge to decide to which of its PCP servers to send the request (e.g., an IPv4 address or an IPv6 address), and if to send one or two MAP requests for each of its interfaces (e.g., if the PCP client has only an IPv4 address but wants both IPv6 and IPv4 listeners, it sends a MAP request containing the all-zeros IPv6 address in the Suggested External Address field, and sends a second MAP request containing the all-zeros IPv4 address in the Suggested External Address field. If the PCP client has both an IPv4 and IPv6 address, and only wants an IPv4 listener, it sends one MAP request from its IPv4 address (if the PCP server supports NAT44 or IPv4 firewall) or one MAP request from its IPv6 address (if the PCP server supports NAT64). The PCP client can simply request the desired mapping to determine if the PCP server supports the desired mapping. Applications that embed IP addresses in payloads (e.g., FTP, SIP) will find it beneficial to avoid address family translation, if possible.

The MAP and PEER requests include a Suggested External IP Address field. Some PCP-controlled devices, especially CGN but also multi-homed NPTv6 networks, have a pool of public-facing IP addresses. PCP allows the client to indicate if it wants a mapping assigned on a specific address of that pool or any address of that pool. Some applications will break if mappings are created on different IP addresses (e.g., active mode FTP), so applications should carefully consider the implications of using this capability. Static mappings for that Internal Address (e.g., those created by a command-line interface on the PCP server or PCP-controlled device) may exist to a certain External Address, and if the Suggested External IP Address is the all-zeros address, PCP should assign its mappings to the same External Address, as this can also help applications using a mix of both static mappings and PCP-created mappings. If, on the other hand, the Suggested External IP Address contains a non-zero IP address the PCP Server SHOULD create a mapping to that external address, even if there are other mappings from that same Internal Address to a different External Address. Once an Internal Address has no implicit dynamic mappings and no explicit dynamic mappings in the PCP-controlled device, a subsequent implicit or explicit mapping for that Internal Address MAY be assigned to a different External Address. Generally, this re-assignment would occur when a CGN device is load balancing newly-seen Internal Addresses to its public pool of External Addresses.

FIG. 1 illustrates an example content delivery system 100 that uses port control protocol. The system 100 includes client device 105 that communicates with a router 110. The router 110 also acts as PCP proxy and receives PCP request from the client device 105. The PCP Proxy propagates the client request to PCP server 105 and receives response from the Port Control Protocol (PCP) server 115. The PCP server 115 receives data from the upstream content delivery network 120 that is connected to various downstream content delivery networks such as downstream content delivery network 125 and downstream content delivery network 130. The downstream content delivery network 125 and 130 store and delivery content through the system 100 to the client device 105.

The client device 105 may be any appropriate type of computing device such as a mobile phone, tablet computer, music player, e-book reader, laptop or desktop computer, PDA, smart phone, or other stationary or portable device and can include one or more processors and computer readable media. Among other components, the client device 105 includes an input module such as a keyboard, mouse, or touch screen, a communication interface, and a display.

The client device 105 can receive a request for content from a user. For example, a user may be requesting to watch the video on the client device. The client 105 may not have direct access to the video and requests the video from the upstream content delivery network 120. The request that the client 105 transmits to the upstream content delivery network 120 may be a hypertext transfer protocol (HTTP) request in a TCP connection. In addition to sending the HTTP request to the upstream content delivery network 120, the client device 105 sends various parameters to the router 110 and the router 110 sends the parameters to the PCP server 115. The parameters contain a desired bit rate for the client device 105 to receive the requested content. For example, the client 105 may be requesting that the content be delivered at 10 Mbits per second, "low" downstream delay tolerance, "very low" downstream loss tolerance, etc.

In some implementations, the parameters are sent in a PCP peer request and the parameters are part of the PCP FLOWDATA option. The PCP request is used by the client device 105 to signal to the system the desired bit rate of the content. In some implementations, the router is a PCP proxy and the PCP proxy communicates the PCP peer request with the PCP FLOWDATA option to the PCP server 115.

In some implementations, the PCP server 115 communicates with the upstream content delivery network 120 using an interworking function. Using the interworking function the PCP server 115 communicates the parameters that the client device 105 requested to the upstream content delivery network. For example, if the client device 105 requested a video at 10 Mbits per second, then the PCP server would communicate those requested flow characteristics to the upstream content delivery network using an interworking function.

With the requested parameters from the PCP server 115 and the content request from the client device 105, the upstream content delivery network 120 transmits a query to the downstream content delivery network 125 to determine whether the downstream content delivery network 125 can provide the content at the requested flow parameters. In some implementations, the upstream content delivery network 120 will query multiple downstream content delivery networks. For example the upstream content delivery network 120 may query the downstream content delivery network 125 and the downstream content delivery network 130. The downstream content delivery network 125 may respond that it can provide the requested content and satisfy the requested parameters while the downstream content delivery network 130 may respond that it cannot provide the requested content and satisfy the requested parameters. In some implementations, the response from one of the downstream content delivery networks may contain the URL of the surrogate in the downstream content network 125 that can provide the requested content at the requested parameters. In some implementations, the query from the upstream content delivery network 125 to one of the downstream content delivery networks 125 or 130 uses recursive request redirection. Additionally, the PCP server 115 transmits a PCP PEER response that contains the offered parameters to the router 110, and the router transmits that PCP peer response to the client device 105.

Once the upstream content delivery network 120 determines which downstream content delivery network can provide the requested content and satisfy the requested parameters, the upstream content delivery network 120 transmits data to the client device 105 indicating which downstream content delivery network 120 can provide the content at the requested parameters. The data transmitted to the client device 105 may include an HTTP redirection that includes the URL of the surrogate in the downstream content delivery network that indicated that it could provide the requested content at the requested parameters which in this example is the downstream content delivery network 125.

With the URL of the surrogate in the downstream content delivery network 125, the client device 105 requests the content from the downstream content delivery network 125. The client device 105 also notifies the router 110 co-located with PCP proxy to give priority to the data being received from the downstream content delivery network 125. In some implementations, the notification from the client device 105 is a PCP peer request with the FLOWDATA option. The client device 105 determines the level of priority to request for the content on the requested content and on the PCP FLOWDATA option. For example, a request for a streaming video at 10 Mbits per second may cause the client device 105 to request high priority for the video data. As another example, a request for a software update at 3 Mbits per second may cause the client device 105 to request low priority for the software update data. The router 110 then notifies the PCP server 115 of the downstream content delivery network 125 and of the requested priority to give to the data from the downstream content delivery network 125.

In some implementations, the notification from the router 110 to the PCP server 115 is a PCP peer request relayed with the FLOWDATA option.

In some implementations, after the upstream content delivery network 120 transmits a query to the downstream content delivery network 125 to determine whether the downstream content delivery network can provide the content at the requested parameters, the downstream content delivery network 125 may respond that the downstream content delivery network 125 can serve the contest at the requested parameters, but after a specific amount of time. For example, the downstream content delivery network 125 may specify that it can provide the content at the requested parameters after forty-five seconds. In this instance the downstream content delivery network 125 will also respond with the URL of the surrogate in the downstream content delivery network 125 that will be able to provide the content at the requested parameters after the specific amount of time.

Instead of the downstream content delivery network 125 responding that it can provide the content at the requested parameters after a particular amount of time, the downstream content delivery network 125 may respond that it can serve the content at reduced parameters. For example, if the upstream content delivery network 125 requests a streaming video at 10 megabits per second, the downstream content delivery network may respond that it can provide the streaming video but at a lower bitrate for, e.g., 3 megabits per second.

Once the upstream content delivery network 120 receives responses from the downstream content delivery networks, the upstream content delivery network 120 notifies the client device 105 of the response of the downstream content delivery networks. Additionally, the PCP server 115 transmits a PCP peer response that contains the requested parameters to the router 110, and the router transmits that PCP peer response to the client device 105.

After the client device 105 receives the response from the downstream content delivery network 125, the client device 105 and requests the content after the particular amount of time from the downstream content delivery network 125. The client device 105 then sends a PCP request to the router 110. In some implementations, the PCP request contains the flow data option and instructs the router 110 co-located with PCP proxy to give priority to data being received from the downstream content delivery network 125.

Figure 2:
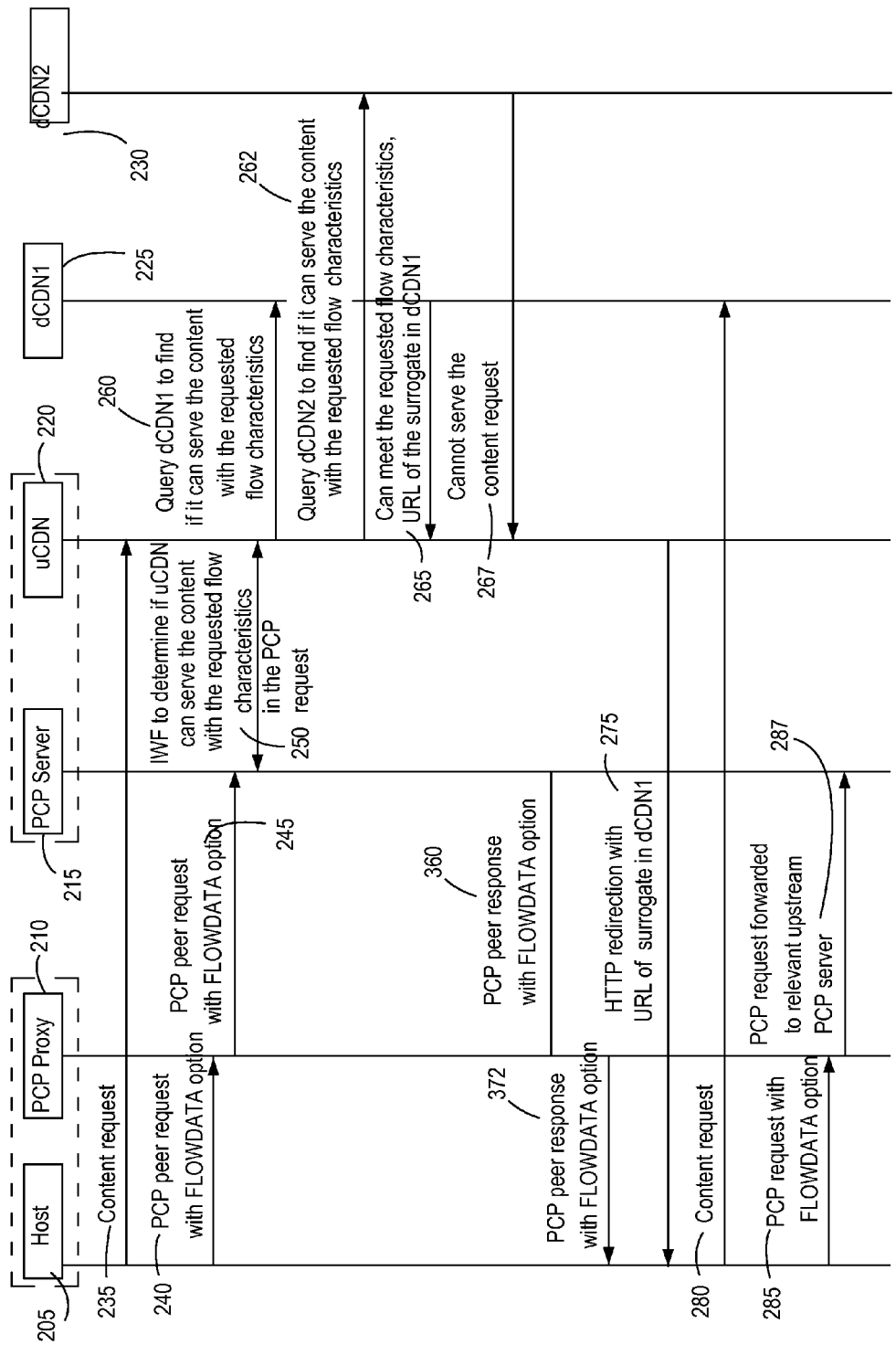
FIGS. 2-3 illustrate example diagrams of a content delivery network using Port Control Protocol.

FIG. 2 illustrates an example diagram of a content delivery network using Port Control Protocol. The content delivery network of FIG. 2 may be similar to the content delivery network illustrated in FIG. 1. In general the content delivery network of FIG. 2 transmits a request for content to an upstream content delivery network with particular delivery parameters and receives the requested content at the requested parameters.

The Home Network includes a host 205. The host may be a computing device such as the client device 105. The host 205 receives a request from a user to view content on the host. In some implementations, the request may be a request to view a streaming video. The host 205 requests the content from the upstream content delivery network 220 (235). As part of that request for content, the host 205 also sends a PCP peer request containing a FLOWDATA option to the PCP proxy 210 (240) and the PCP server 215 (245). The PCP proxy 210 may be included in the router 110 of FIG. 1. The flow data option may contain parameters necessary to view the content. For example, the flow data option may contain a request to view the content at 10 Mbits per second.

The PCP server 215 communicates through an interworking function with the upstream content delivery network 220 (250). The interworking function allows the PCP server 215 to communicate with the upstream content delivery network 220 to determine whether the upstream content delivery network 220 can deliver the content at the requested parameters in the flow data option. The interworking function also allows the PCP server to determine whether the context request is from a content delivery network located in the same administrative domain using the remote peer IP address field of the PCP request and setting the report peer port field to 80/443.

The upstream content delivery network 220 communicates with downstream content delivery networks 225 and 230 to determine if either of the downstream content delivery networks 225 or 230 can deliver the content at the requested parameters (260 and 262). In the example illustrated in FIG. 2, the downstream content delivery network 225 determines that it can deliver the content at the requested parameters (265). The downstream content delivery network 225 also sends a URL of the surrogate that will be providing the content to the upstream content delivery network 220. The downstream content delivery network 230 determines that it cannot provide the content at the requested parameters and notifies the upstream content delivery network 220 (267).

The PCP server 215 receives, through the interworking function, an indication of the downstream content delivery networks that can provide the content at the requested flow data option. The PCP server 215 then sends this information as a PCP peer response that contains the flow data option to the PCP proxy 210 (270) which in turn sends the information to the host 205 (272). The upstream content delivery network also provides to the host an HTTP redirection that contains the URL of the surrogate that will be providing the content to the host 205 (275).

Once the host 205 has the URL of the surrogate, the host 205 requests the content from the downstream content delivery network 225 (280). In order for the PCP proxy 210 and the PCP server 215 to give the content data priority, the host 205 sends a PCP PEER request with the FLOWDATA option to the PCP proxy 210 (285) which in turn sends the request to the PCP server 215 (287).

Figure 3:
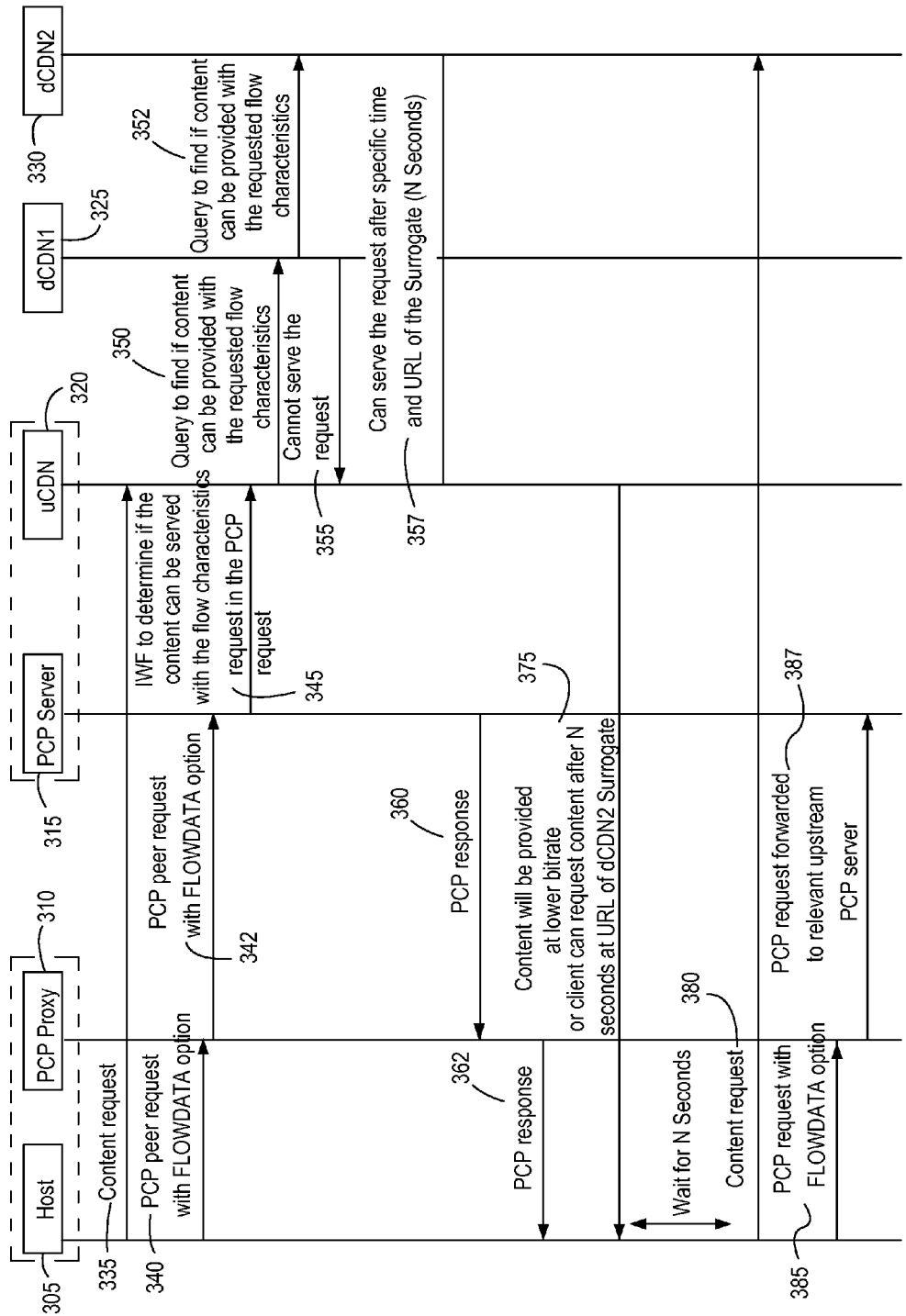

FIG. 3 illustrates an example diagram of a content delivery network using Port Control Protocol. The content delivery network of FIG. 3 may be similar to the content delivery network illustrated in FIG. 1. In general the content delivery network of FIG. 3 transmits a request for content to an upstream content delivery network with particular delivery parameters and receives the requested content at parameters that are different than the requested parameters or at the parameters but at a later time.

The Home Network includes a host 305. The host may be a computing device such as the client device 105. The host 305 receives a request from a user to view content on the host. In some implementations, the request may be a request to view a streaming video. The host 305 requests the content from the upstream content delivery network 320 (335). As part of that request for content, the host 305 also sends a PCP peer request containing a FLOWDATA option to the PCP proxy 310 (340) and the PCP server 215 (342). The PCP proxy 310 may be included in the router 110 of FIG. 1. The PCP FLOWDATA option may contain parameters necessary to view the content. For example, the FLOWDATA option may contain a request to view the content at 10 Mbits per second.

The PCP server 315 communicates through an interworking function with the upstream content delivery network 220 (345). The interworking function allows the PCP server 315 to communicate with the upstream content delivery network 320 to determine whether the upstream content delivery network 320 can deliver the content at the requested parameters in the flow data option. The interworking function also allows the PCP server to determine whether the context request is from a content delivery network located in the same administrative domain using the remote peer IP address field of the PCP request and setting the report peer port field to 80/443.

The upstream content delivery network 320 communicates with downstream content delivery networks 325 and 330 to determine if either of the downstream content delivery networks 325 or 230 can deliver the content at the requested parameters (350 and 352). In the example illustrated in FIG. 3, the downstream content delivery network 325 determines that it cannot deliver the content at the requested parameters (355). The downstream content delivery network 330 determines that it can provide the content at the requested parameters after a particular amount of time and notifies the upstream content delivery network 320 (357).

The PCP server 315 receives, through the interworking function, an indication of the downstream content delivery networks that can provide the content at the requested flow data option. The PCP server 315 then sends this information as a PCP peer response that contains the flow data option to the PCP proxy 310 (360) which in turn sends the information to the host 305 (362). The upstream content delivery network 320 also provides to the host an HTTP redirection that contains the URL of the surrogate of the downstream content delivery network 330 that will be providing the content to the host 305 after the particular amount of time (375). In some implementations, the surrogate of the content delivery network will be providing the content to the host 305 at a reduced bit rate without the delay of the particular amount of time.

Once the host 305 has the URL of the surrogate, the host 305 waits for the particular amount of time and requests the content from the downstream content delivery network 325 (380). In order for the PCP proxy 310 and the PCP server 315 to give the content data priority, the host 305 sends a PCP peer request with the flow data option to the PCP proxy 310 (385) which in turn sends the request to the PCP server 315 (387).

Figure 4:
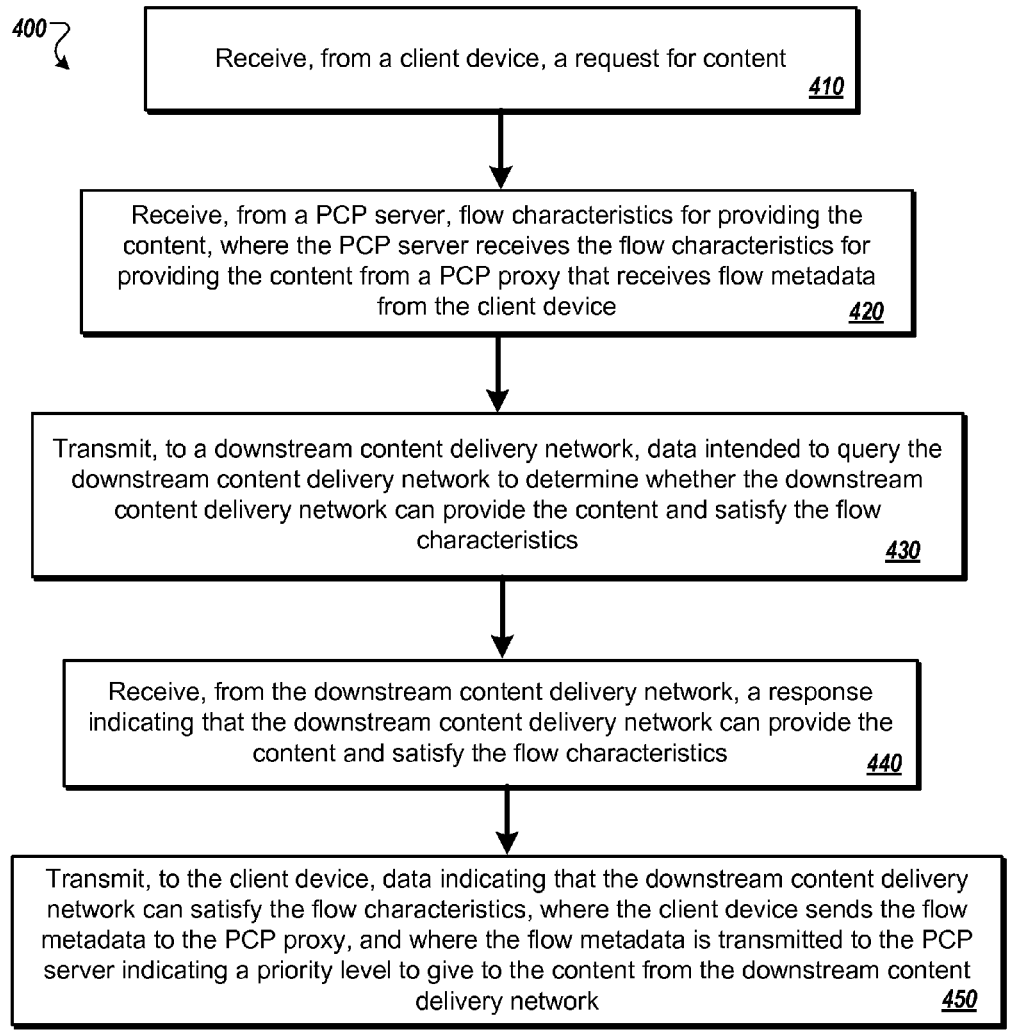
FIGS. 4-5 illustrate an example of processes of content delivery network using Port Control Protocol.

FIG. 4 illustrates an example process 400 of content delivery network using port control protocol. In general, the process 400 receives a request for content from a client device and determines the downstream content delivery network that can deliver the content at parameters requested by the client. The client device and the content delivery network communicate using PCP responses and requests. The process 400 may be a content delivery system such as the content delivery system 100 illustrated in FIG. 1. In some implementations, the process 400 may be performed by the upstream content delivery network 120 illustrated in FIG. 1.

The system receives, from a client device, a request for content (410). In some implementations, the request may originate from a user. For example, the user may be requesting to watch a streaming video or the client device may be requesting a software update. The system receives, from a PCP server, data associated with parameters for delivering the content (420). The PCP server receives the data associated with the parameters for providing the content from a PCP proxy which in turn receives the flow metadata from client. In some implementations, the data associated with the parameters for providing the content comprises a PCP peer request and PCP flow data. For example, the data associated with the parameters may include data indicating a requested bit rate such as 15 Mbits per second. In some implementations, the system receives the data associated with the parameters for delivering the content through an interworking function.

In some implementations, the system identifies a remote peer internet protocol address field in the PCP request. The system determines that a remote peer port field of the PCP request is 80/443. The system determines, through the interworking function and based on the remote peer internet protocol address and the remote peer port field of the PCP request being 80/443, that PCP server and the upstream content delivery network share the same administrative domain.

The system transmits, to a downstream content delivery network, data intended to query the downstream content delivery network to determine whether the downstream content delivery network can provide the content and satisfy the parameters (430). The system receives, from the downstream content delivery network, a response indicating that the downstream content delivery network can provide the content and satisfy the parameters (440).

The system transmits, to the client device, data indicating that the downstream content delivery network can satisfy the parameters (450). The client device sends data to the PCP proxy and the PCP server indicating a priority level to give to content from the downstream content delivery network. In some implementations, the priority level to give to content from the downstream content delivery network is determined based on the PCP FLOWDATA. For example, the priority level for a streaming video may be high relative to other traffic, or the priority level for a software update may be low relative other traffic. The software update can occur during times where there is less traffic while a user may want to watch a streaming video at a particular time.

Figure 5:
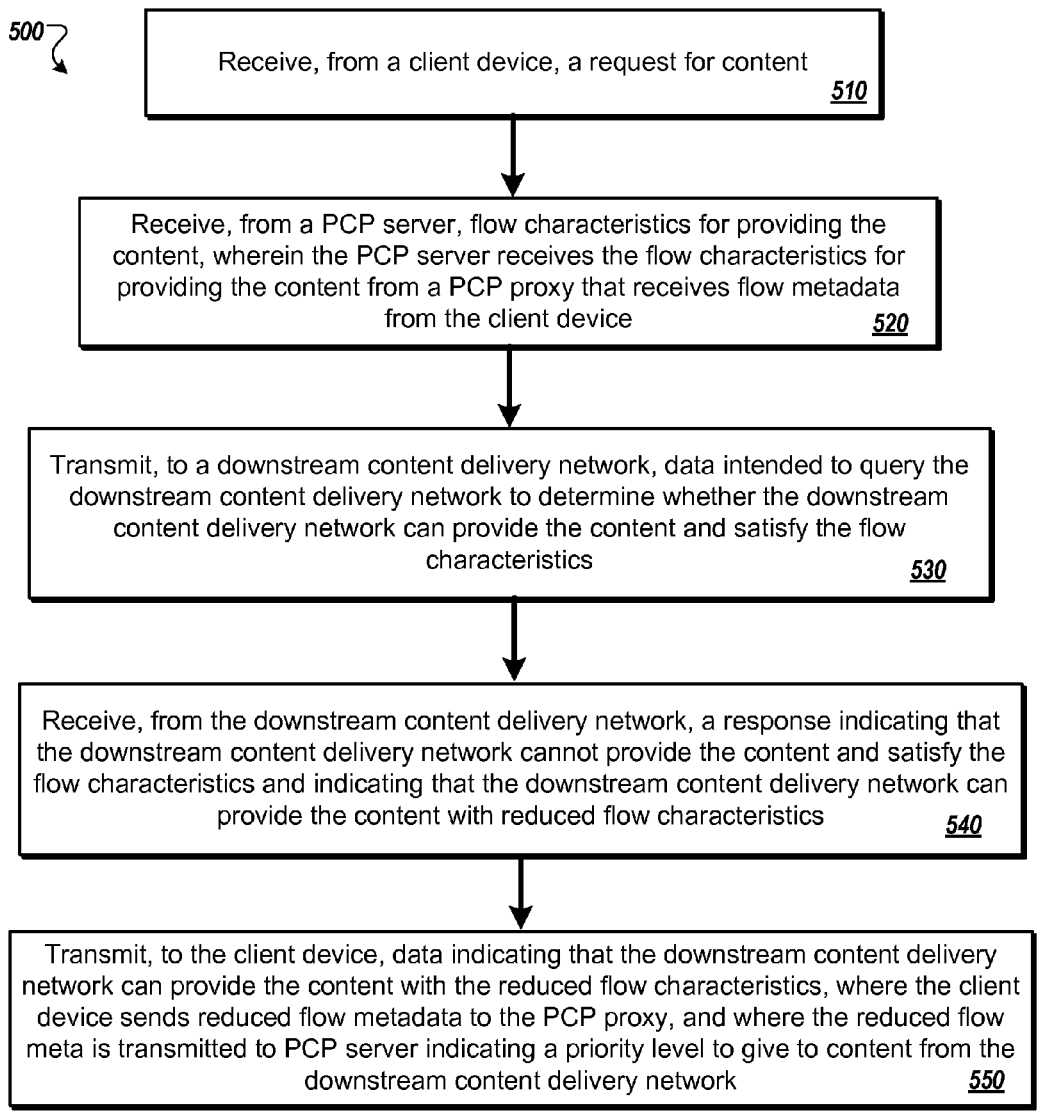

FIG. 5 illustrates an example process 500 of content delivery network using port control protocol. In general, the process 400 receives a request for content from a client device and determines the downstream content delivery network that can deliver the content at parameters that are different than those requested by the client. For example, the downstream content delivery network may be able to deliver the content at the requested parameters but at a later time or deliver the content at different parameters at the requested time. The client device and the content delivery network communicate using PCP responses and requests. The process 500 may be a content delivery system such as the content delivery system 100 illustrated in FIG. 1. In some implementations, the process 500 may be performed by the upstream content delivery network 120 illustrated in FIG. 1.

The system receives, from a client device, a request for content (510). In some implementations, the request may originate from a user. For example, the user may be requesting to watch a streaming video or the client device may be requesting a software update. The system receives, from a PCP server, data associated with parameters for delivering the content (520). The PCP server receives the data associated with the parameters for delivering the content from a PCP proxy which in turn receives the flow metadata from client.

The system transmits, to a downstream content delivery network, data intended to query the downstream content delivery network to determine whether the downstream content delivery network can deliver the content and satisfy the parameters (530). The system receives, from the downstream content delivery network, a response indicating that the downstream content delivery network cannot provide the content and satisfy the parameters and indicating that the downstream content delivery network can provide the content with reduced parameters (540). In some implementations, the reduced parameters indicate that the downstream content delivery network can provide the content and satisfy the parameters after a particular amount of time. For example, the downstream content delivery network may be able to provide the content at the requested parameters after five minutes. In some implementations, the reduced parameters indicate that the downstream content delivery network can provide the content at a lower bit-rate. For example, the downstream content delivery network may be able to provide the content at the requested time at 3 MBits per second instead of the requested 10 MBits per second.

The system transmits, to the client device, data indicating that the downstream content delivery network can provide the content with reduced parameters (550). The client device sends data to the PCP proxy which is propagated to the PCP server indicating a priority level to give to content from the downstream content delivery network.

Implementations of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or combinations of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single embodiment. Conversely, various features that are described in the context of a single embodiment can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by an upstream content delivery network and from a client device, a request for content;
receiving, from a PCP server, flow characteristics for providing the content, wherein the PCP server receives the flow characteristics for providing the content from a PCP proxy that receives the flow characteristics from the client device;
transmitting, to a downstream content delivery network, first data for querying the downstream content delivery network to determine whether the downstream content delivery network can provide the content and satisfy the flow characteristics;
receiving, from the downstream content delivery network, a response indicating the ability of the downstream content delivery network to provide the content and satisfy the flow characteristics; and
transmitting, to the client device, second data based on the response indicating the ability of the downstream content delivery network to provide the content and satisfy the flow characteristics, wherein the client device transmits flow metadata based on the second data to the PCP proxy, and wherein the PCP proxy transmits the flow metadata to the PCP server to indicate a priority level to give to the content received from the downstream content delivery network.

2. The method of claim 1, wherein the flow characteristics for providing the content comprises a PCP PEER request and PCP FLOWDATA option.

3. The method of claim 2, wherein receiving flow characteristics for providing the content comprises receiving, through an interworking function, the flow characteristics for providing the content.

4. The method of claim 3, comprising:
identifying a remote peer internet protocol address field in the PCP request;
determining that a remote peer port field of the PCP request is 80/443; and
determining, through the interworking function and based on the remote peer internet protocol address and the remote peer port field of the PCP request being 80/433, that the PCP server and the upstream content delivery network share a same administrative domain.

5. The method of claim 2, wherein the priority level to give to content from the downstream content delivery network is determined based on the PCP FLOWDATA option.

6. The method of claim 1, wherein the response indicating the ability of the downstream content delivery network to provide the content and satisfy the flow characteristics indicates that the downstream content delivery network can provide the content and satisfy the flow characteristics, and
  wherein the second data based on the response indicating the ability of the downstream content delivery network to provide the content and satisfy the flow characteristics indicates that the downstream content delivery network can satisfy the flow characteristics.

7. The method of claim 1, wherein the response indicating the ability of the downstream content delivery network to provide the content and satisfy the flow characteristics indicates (i) that the downstream content delivery network cannot provide the content and satisfy the flow characteristics and (ii) that the downstream content delivery network can provide the content with reduced flow characteristics, and
  wherein the second data based on the response indicating the ability of the downstream content delivery network to provide the content and satisfy the flow characteristics indicates that the downstream content delivery network can provide the content with the reduced flow characteristics.

8. The method of claim 7, wherein the reduced flow characteristics indicate that the downstream content delivery network can provide the content and satisfy the flow characteristics after a particular amount of time.

9. The method of claim 7, wherein the reduced flow characteristics indicate that the downstream content delivery network can provide the content at a lower bit-rate.

10. A system comprising:
  one or more computers and one or more storage devices storing instructions that are operable, when executed by the one or more computers, to cause the one or more computers to perform operations comprising:
    receiving, by an upstream content delivery network and from a client device, a request for content;
    receiving, from a PCP server, flow characteristics for providing the content, wherein the PCP server receives the flow characteristics for providing the content from a PCP proxy that receives the flow characteristics from the client device;
    transmitting, to a downstream content delivery network, first data for querying the downstream content delivery network to determine whether the downstream content delivery network can provide the content and satisfy the flow characteristics;
    receiving, from the downstream content delivery network, a response indicating the ability of the downstream content delivery network to provide the content and satisfy the flow characteristics; and
    transmitting, to the client device, second data based on the response indicating the ability of the downstream content delivery network to provide the content and satisfy the flow characteristics, wherein the client device transmits flow metadata based on the second data to the PCP proxy, and wherein the PCP proxy transmits the flow metadata to the PCP server to indicate a priority level to give to the content received from the downstream content delivery network.

11. The system of claim 10, wherein the flow characteristics for providing the content comprises a PCP PEER request and PCP FLOWDATA option.

12. The system of claim 11, wherein receiving flow characteristics for providing the content comprises receiving, through an interworking function, the flow characteristics for providing the content.

13. The system of claim 12, wherein the operations further comprise:
  identifying a remote peer internet protocol address field in the PCP request;
  determining that a remote peer port field of the PCP request is 80/443; and
  determining, through the interworking function and based on the remote peer internet protocol address and the remote peer port field of the PCP request being 80/443, that the PCP server and the upstream content delivery network share a same administrative domain.

14. The system of claim 11, wherein the priority level to give to content from the downstream content delivery network is determined based on the PCP FLOWDATA option.

15. The system of claim 10, wherein the response indicating the ability of the downstream content delivery network to provide the content and satisfy the flow characteristics indicates that the downstream content delivery network can provide the content and satisfy the flow characteristics, and
  wherein the second data based on the response indicating the ability of the downstream content delivery network to provide the content and satisfy the flow characteristics indicates that the downstream content delivery network can satisfy the flow characteristics.

16. The system of claim 10, wherein the response indicating the ability of the downstream content delivery network to provide the content and satisfy the flow characteristics indicates (i) that the downstream content delivery network cannot provide the content and satisfy the flow characteristics and (ii) that the downstream content delivery network can provide the content with reduced flow characteristics, and
  wherein the second data based on the response indicating the ability of the downstream content delivery network to provide the content and satisfy the flow characteristics indicates that the downstream content delivery network can provide the content with the reduced flow characteristics.

17. The system of claim 16, wherein the reduced flow characteristics indicate that the downstream content delivery network can provide the content and satisfy the flow characteristics after a particular amount of time.

18. The system of claim 16, wherein the reduced flow characteristics indicate that the downstream content delivery network can provide the content at a lower bit-rate.

19. A non-transitory computer-readable media having software encoded thereon, the software when executed by a processor operable to:
  receive, by an upstream content delivery network and from a client device, a request for content;
  receive, from a PCP server, flow characteristics for providing the content, wherein the PCP server receives the flow characteristics for providing the content from a PCP proxy that receives the flow characteristics from the client device;
  transmit, to a downstream content delivery network, first data for querying the downstream content delivery network to determine whether the downstream content delivery network can provide the content and satisfy the flow characteristics;
  receive, from the downstream content delivery network, a response indicating the ability of the downstream content delivery network to provide the content and satisfy the flow characteristics; and
  transmit, to the client device, second data based on the response indicating the ability of the downstream content delivery network to provide the content and satisfy the flow characteristics, wherein the client device transmits flow metadata based on the second data to the PCP proxy, and wherein the PCP proxy transmits the flow metadata to the PCP server to indicate a priority level to give to the content received from the downstream content delivery network.

20. The non-transitory computer-readable media of claim 19, wherein the flow characteristics for providing the content comprises a PCP PEER request and PCP FLOWDATA option.

* * * * *

UNITED STATES PATENT AND TRADEMARK OFFICE
CERTIFICATE OF CORRECTION

PATENT NO. : 9,450,913 B2  
APPLICATION NO. : 14/169526  
DATED : September 20, 2016  
INVENTOR(S) : Tirumaleswar Reddy et al.

Page 1 of 1

It is certified that error appears in the above-identified patent and that said Letters Patent is hereby corrected as shown below:

In the Claims

In Column 12, Line 59, Claim 4, please amend as shown:
remote peer port field of the PCT request being 80/443, Signed and Sealed this
Nineteenth Day of January, 2021

Andrei Iancu
*Director of the United States Patent and Trademark Office*